(12) United States Patent
Soderquist

(10) Patent No.: US 7,210,702 B2
(45) Date of Patent: May 1, 2007

(54) AIRBAG CUSHION WITH IMPROVED FABRIC DEFLECTOR DESIGN

(75) Inventor: Quin Soderquist, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 272 days.

(21) Appl. No.: 10/874,452

(22) Filed: Jun. 23, 2004

(65) Prior Publication Data

US 2005/0285379 A1 Dec. 29, 2005

(51) Int. Cl.
*B60R 21/26* (2006.01)

(52) U.S. Cl. .................................. 280/740; 280/743.1

(58) Field of Classification Search ................ 280/740, 280/729, 731, 742, 743.1
See application file for complete search history.

(56) References Cited

U.S. PATENT DOCUMENTS

| | | | | |
|---|---|---|---|---|
| 5,249,824 A | 10/1993 | Swann et al. | ................ | 280/729 |
| 5,492,362 A * | 2/1996 | Lehman et al. | ............. | 280/739 |
| 5,513,879 A | 5/1996 | Patel et al. | .................. | 280/739 |
| 5,573,270 A | 11/1996 | Sogi et al. | ................... | 280/740 |
| 5,669,632 A * | 9/1997 | Johnson et al. | .......... | 280/743.2 |
| 5,833,265 A | 11/1998 | Seymour | .................. | 280/743.1 |
| 5,884,574 A | 3/1999 | Sogi et al. | ................... | 112/441 |
| 5,918,902 A | 7/1999 | Acker et al. | ............. | 280/743.1 |
| 5,957,485 A | 9/1999 | Hirai | ........................... | 280/729 |
| 6,022,046 A | 2/2000 | Isomura et al. | .......... | 280/743.2 |
| 6,089,599 A | 7/2000 | Schimmoller et al. | ...... | 280/740 |
| 6,089,600 A | 7/2000 | Schenck et al. | ............ | 280/740 |
| 6,283,499 B1 * | 9/2001 | Nelsen et al. | ............... | 280/729 |
| 6,478,331 B1 | 11/2002 | Lang | .......................... | 280/740 |
| 6,612,609 B1 | 9/2003 | Rodriguez et al. | .......... | 280/729 |
| 6,648,366 B2 | 11/2003 | Dillon et al. | ............... | 280/729 |
| 6,848,714 B2 * | 2/2005 | Varcus | ..................... | 280/743.1 |
| 2003/0151233 A1 | 8/2003 | Varcus | ....................... | 280/729 |

FOREIGN PATENT DOCUMENTS

| | | |
|---|---|---|
| EP | 1 024 060 A1 | 8/2000 |
| GB | 2252083 A | 1/1991 |
| GB | 2 261 855 | 6/1993 |
| GB | 2 277 719 A | 11/1994 |
| GB | 2 331 049 A | 5/1999 |
| WO | WO 98/42543 | 3/1998 |
| WO | WO 00/15474 | 6/1999 |
| WO | WO 99/42332 | 8/1999 |

* cited by examiner

*Primary Examiner*—Paul N. Dickson
*Assistant Examiner*—Drew J. Brown
(74) *Attorney, Agent, or Firm*—Sally J Brown; Stoel Rives LLP

(57) ABSTRACT

A fabric deflector system is disclosed for use with airbags and airbag systems. The system comprises a deflector panel attached to an airbag cushion body. The deflector panel is attached to the airbag cushion body in a position such that the deflector panel at least partially deflects the inflation gas received from the inflator during inflation of the airbag cushion. The deflector panel comprises a plurality of arms extending radially outward from the inflator opening and at least partially deflects the inflation gas through the arms.

46 Claims, 3 Drawing Sheets

AIRBAG CUSHION WITH IMPROVED FABRIC DEFLECTOR DESIGN

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

The invention described hereinafter relates to inflatable airbags and more specifically to a design for a fabric deflector to be attached to an airbag cushion to assist in controlling inflation gases as they enter the cushion.

The venting system described hereinafter can be applied to airbags or airbag systems during production or can be retrofit to existing airbags or airbag systems. Generally, the system comprises a deflector panel attached to an airbag cushion body. The deflector panel is typically positioned over the opening in the airbag cushion body that accommodates the airbag inflator. The deflector panel at least partially deflects the inflation gas received from the inflator during inflation of the airbag cushion. By utilizing the principles set forth herein, the forward thrust of the airbag toward an occupant may be reduced. In addition, when these features are employed in a driver-side airbag system, radial or lateral inflation gas flow may be improved to provide for more rapid protection of the steering wheel rim.

Figure 1A:
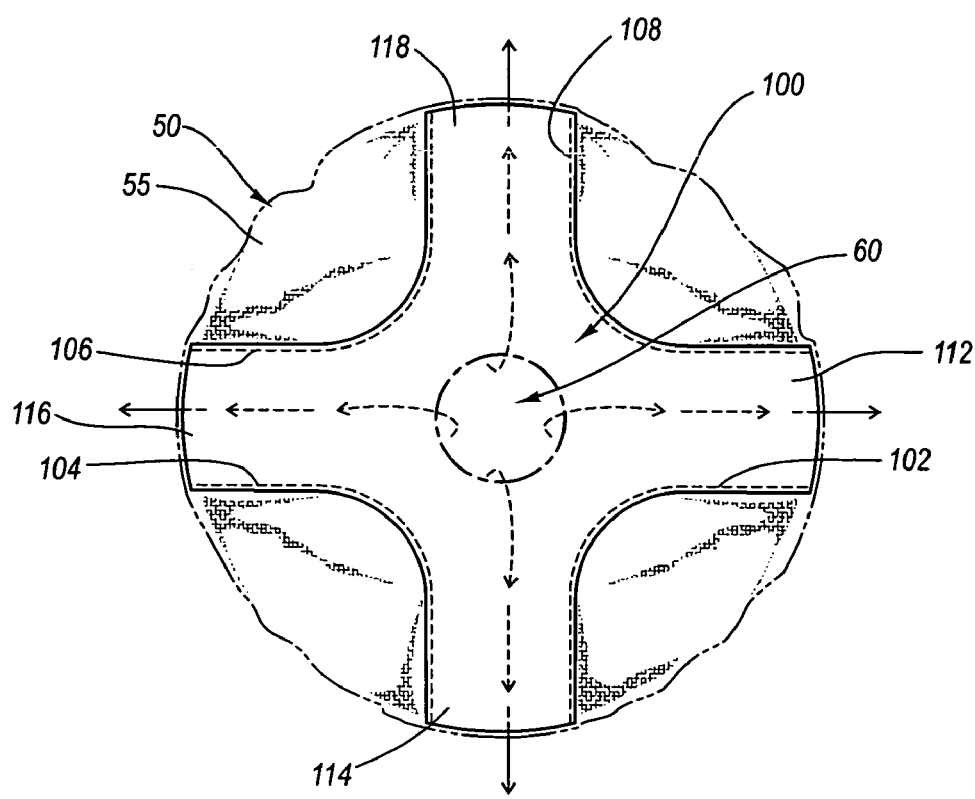
FIG. 1A is a plan view of one embodiment of a deflector panel made up of a single piece of material.

FIG. 1A depicts an airbag cushion having a one-piece deflector panel 100 attached thereto. Deflector panel 100 is attached to the interior surface 55 of the airbag cushion body 50. In embodiments of airbag cushions having front and rear airbag panels, the deflector panel will typically be attached to the interior surface of the rear panel—i.e., the panel furthest away from an occupant upon deployment.

The deflector panel may be comprised of a number of different materials. Examples of suitable materials include cloth or other fabric materials, plastic, nylon or composite synthetics, metallic films, and reinforced paper. Any of the above materials may be uncoated or coated with a substance such as silicone. The deflector panel is attached to the interior surface 55 of the airbag cushion 50 over inflator opening 60 and at attachment lines 102, 104, 106, and 108. Note that inflator opening 60 is shown in phantom in the accompanying drawings due to the fact that it is underneath the deflector panel. The embodiment of a deflector panel depicted in FIG. 1A includes four arms, shown at 112, 114, 116, and 118. It should be understood, however, that deflector panels in accordance with the general principles of the invention may include any number of arms. Thus, whereas the embodiment shown in FIG. 1A has four arms, other embodiments may have two, three, five, six, eight, or any other number of arms as desired.

In the embodiment depicted in FIG. 1A, each of the deflector panel arms also include inflation gas tunnels defined by the attachment lines. Because the deflector panel is attached directly to the airbag, the inflation gas tunnels in this embodiment are also defined in part by the airbag cushion body. As shown by the arrows in the figure, upon deployment of the airbag, inflation gas enters the airbag through the inflator opening and is then deflected laterally through the inflation gas tunnels along each of the four arms. As can also be seen from the figure, just as the inflation gas exits the tunnels, it is traveling in a direction approximately parallel to the attachment lines. Of course, after the gas exits the inflation gas tunnels, it then immediately travels in random directions in accordance with its path of least resistance within the airbag.

Figure 1B:
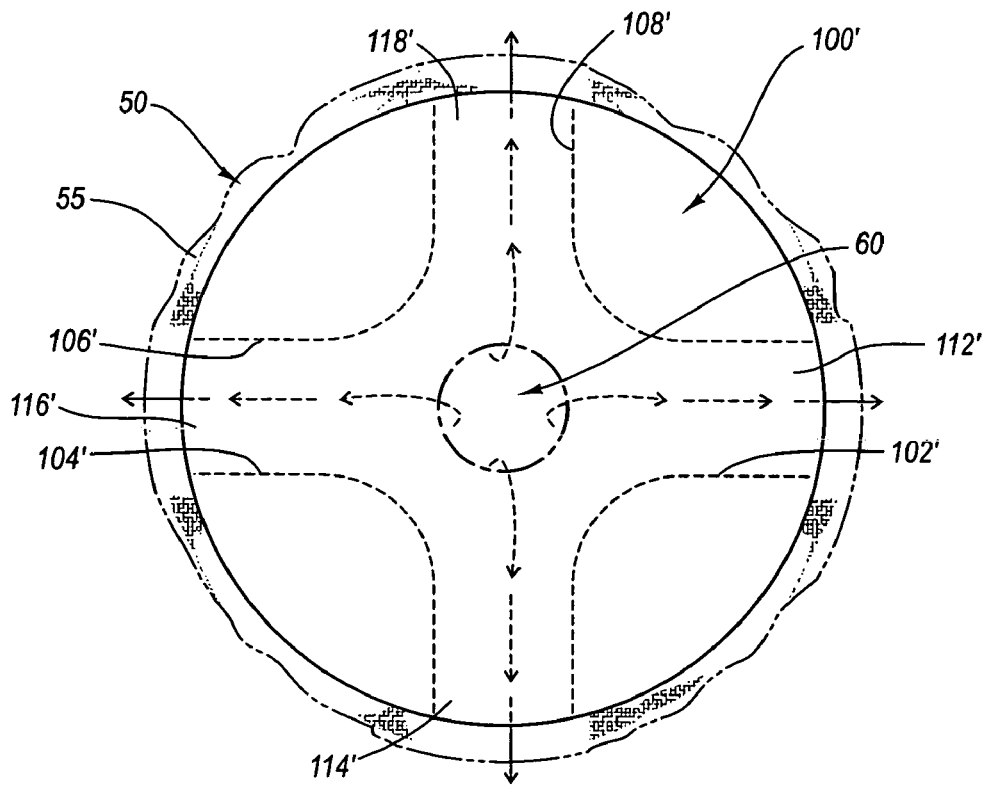
FIG. 1B is a plan view of another embodiment of a deflector panel also made up of a single piece of material, but with the deflector panel arms defined solely by attachment lines.

The deflector panel design shown in FIG. 1A may be cut into the desired shape from an appropriate piece of fabric or other material or, alternatively, the deflector panel may comprise a round, rectangular, or other shaped piece of material with attachment lines forming both the deflector panel arms and the inflation gas tunnels, as shown with deflector panel 100' in FIG. 1B. Stated otherwise, the inflation gas tunnels are coincident with the deflector panel arms in the embodiment shown in FIG. 1B. Thus, in FIG. 1B, deflector panel 100' is made up of a round piece of material with attachment lines 102', 104', 106', and 108' defining both the deflector panel arms and the inflation gas tunnels, both of which are represented by reference numerals 112', 114', 116', and 118'. It should be understood that in the embodiment depicted in FIG. 1A, the deflector panel arms differ from the inflation gas tunnels only in that the deflector panel arms are slightly wider than the inflation gas tunnels, due to the fact that the attachment lines are inset slightly from the outer edge of the deflector panel 100. In other words, the deflector panel arms and inflation gas tunnels are not coincident. The deflector panel arms are defined by the perimeter of the deflector panel and the inflation gas tunnels are defined by the attachment lines.

The inflation gas tunnels need not necessarily be the same shape as the deflector panel arms. Moreover, it is also possible to have more than one inflation gas tunnel in a deflector panel arm. Such a result may be accomplished by including more than two attachment lines on a single deflector panel arm so that the inflation gas travels in more than one inflation gas tunnel per deflector panel arm. Nevertheless, in each of the embodiments depicted in the accompanying drawings, the inflation gas tunnels are approximately the same shape and are present in the same quantity as the deflector panel arms. The arms may also have varying widths. For example, there may be three arms with one arm which is larger than the other two. This may be useful in a configuration where it is more desirable to permit inflation gas to exit at a greater rate to particular areas of the airbag than to other areas in order to provide greater protection to certain areas of an occupant's body, such as the occupant's abdomen.

Figure 2:
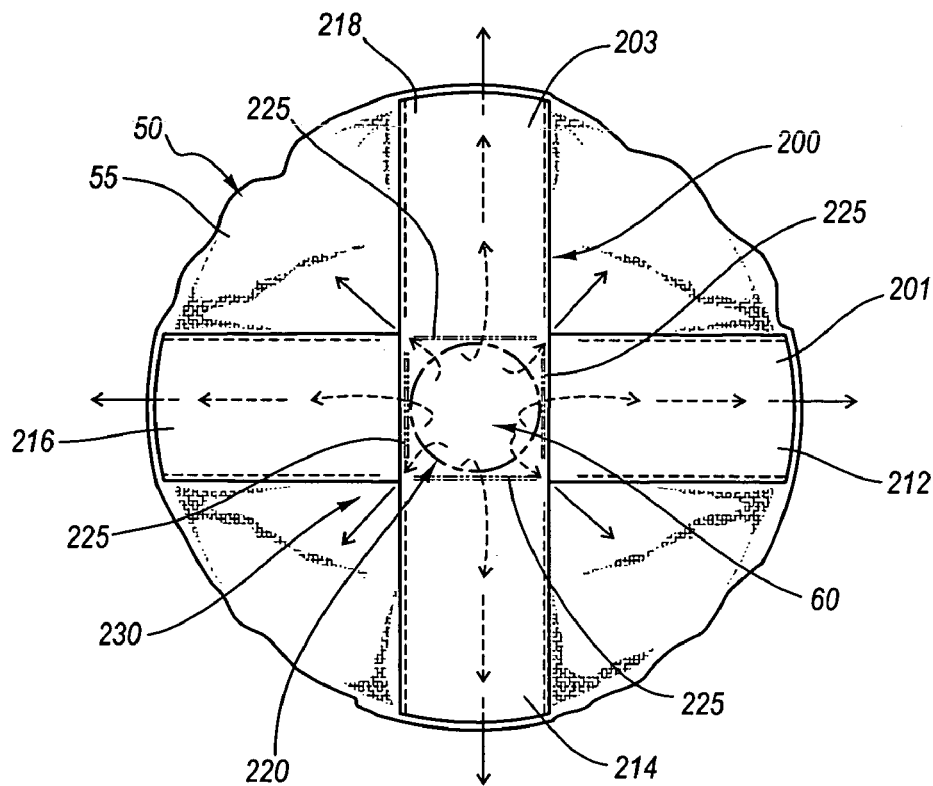
FIG. 2 is a plan view of another embodiment of a deflector panel made up of two crossing pieces of material.

FIG. 2 shows another embodiment of a deflector panel at 200. This embodiment may be formed from two pieces of material, shown in the figure at 201 and 203. These two pieces of material may overlap one another at the location of the inflator opening 60, as shown in the figure, to comprise four deflector panel arms, 212, 214, 216, and 218 (each piece of material individually comprises two deflector panel arms extending away from the inflator opening). In FIG. 2, two of the deflector panel arms—arms 212 and 216—of piece of material 201 extend in a first line and two other deflector panel arms—arms 214 and 218—of piece of material 203 extend in a second line. The line formed from arms 212 and 216 intersects the line formed by arms 214 and 218 at an intersecting middle portion 220 of the deflector panel 200. Thus, the intersecting middle portion 220 in the embodiment of FIG. 2 has a double layer of deflector panel material. Although the embodiment shown in FIG. 2 is formed into the shape of a "plus" symbol, this need not be the case. The pieces of material may instead cross at any other desired angle, so as to form an "X" shape for instance.

Eight attachment lines are used to attach the deflector panel 200 to the airbag cushion body 50. In FIG. 2, the attachment lines at which the deflector panel 200 is attached to the inner surface 55 of the airbag cushion body 50 extend along opposing sides of the deflector panel arms. These attachment lines, however, typically do not extend through the intersecting middle portion of the deflector panel so as to allow inflation gas to exit from the middle portion. One or more lines extending from each of the attachment lines through the intersecting middle portion may, however, include attachment lines which attach the two pieces of material together rather than attaching the deflector panel to the airbag cushion body. Such attachment lines are shown at 225 in FIG. 2. Of course, in embodiments in which the deflector panel is made up of multiple pieces of material, the pieces of material comprising the deflector panel may be attached to one another by any available structure or methodology. The two pieces of material making up the deflector panel in FIG. 2 may, for instance, instead be attached at the intersecting middle portion 220 along the entire or a substantial portion of the surface of the middle portion rather than along one or more lines defining the middle portion as shown in the figure.

As another option incorporated into the embodiment shown in FIG. 2, the deflector panel may comprise one or more unattached portions 230. As seen in FIG. 2, these unattached portions may be located at one or more of the corners or intersections between deflector panel arms. This allows some inflation gas to vent from the center section of the deflector panel into the area defined by the airbag cushion body more quickly. As yet another alternative, one or more of the unattached portions may instead be replaced with weakly attached portions. In this manner, the deflector panel can be designed to create for itself a larger vent area during certain non-typical deployments. For instance, as pressure and/or heat build up in the center of the deflector panel during hot deployments, the weakly attached portions can be designed to break, pull away, or otherwise release, thereby allowing inflation gas to exit from the corners of the middle portion in addition to the ends of the deflector panel arms. The arrows in FIG. 2 depict inflation gas exiting the deflector panel 200 at unattached portions 230, located at each of the intersections between inflation gas tunnels, and also at the end of each of deflector panel arms 212, 214, 216, and 218.

Figure 3:
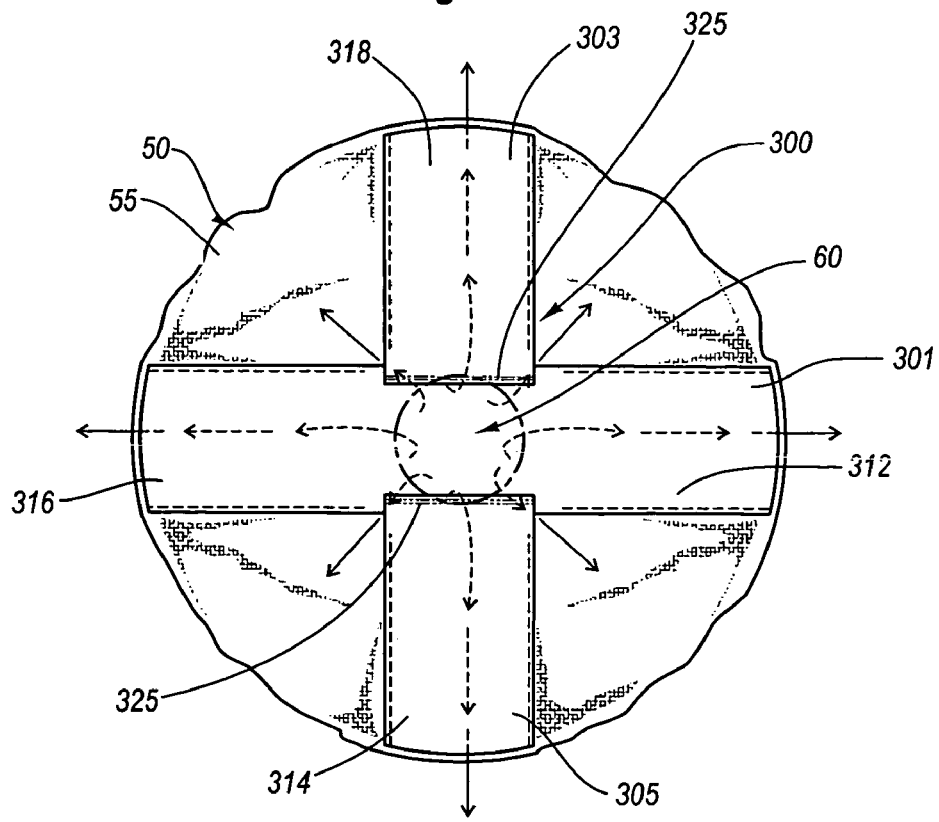
FIG. 3 is a plan view of another embodiment of a deflector panel made up of three pieces of material.

In FIG. 3, another embodiment of the invention is depicted. In this embodiment, three separate rectangular pieces of material—shown at 301, 303, and 305—are used to make up the deflector panel 300. Arms 314 and 318 are made from two separate pieces of material, pieces 305 and 303, respectively, whereas arms 312 and 316 are made from a single longer piece of material, piece 301. As can be seen in FIG. 3, there need not be a double layer of deflector panel material at the center section of the panel as there is in the embodiment depicted in FIG. 2. Like the embodiment shown in FIG. 2, eight attachment lines are used to attach the deflector panel 300 to the airbag cushion body 50. Of course, attachment lines 325 are again used to attach the pieces of the deflector panel 300 together, rather than to attach the deflector panel to the airbag cushion body.

Figure 4:
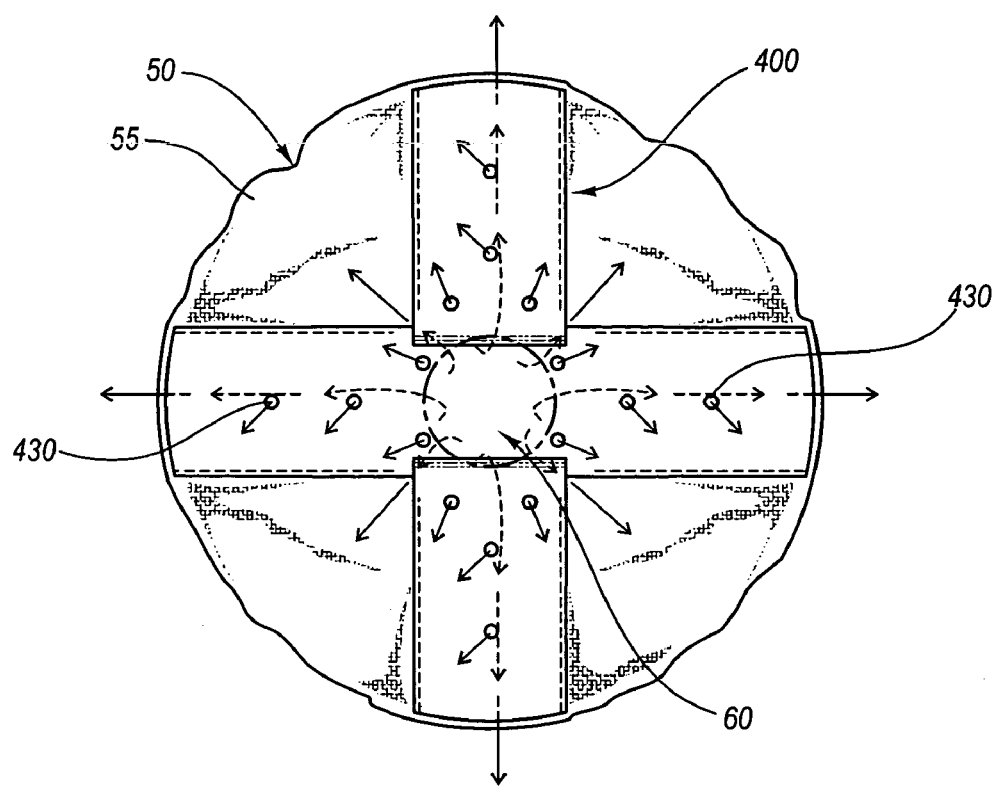
FIG. 4 is a plan view of yet another embodiment of a deflector panel including vent openings.

It may be convenient to form the deflector panel arms from rectangular pieces of material—as shown in FIGS. 2–4—such that the pieces nest well adjacent to one another and can be cut from rolls of material, such as fabric rolls, with minimal waste of the deflector panel material. However, it should be clear that forming the deflector panel in such a manner is not necessary. The panel can be formed from a single piece of material—such as is shown in FIGS. 1A–1B—or any other number of pieces of material as desired. As previously mentioned, embodiments of the deflector panel invention may also include fewer or greater than four deflector panel arms. In addition, the deflector panel arms need not be rectangular in shape. The deflector panel arms may be made up of variety of other shapes. Whatever shape is used, the arms will typically extend and deflect inflation gas radially with respect to the inflator opening.

Yet another embodiment of the invention is shown in FIG. 4. This embodiment is similar to that shown in FIG. 3 with the exception that the deflector panel 400 has a plurality of vent openings 430 formed therein. Vent openings 430 allow some of the inflation gas to exit the deflector panel 400 in a direction perpendicular to the plane containing each of the arms of the deflector panel. The remainder of the gas exits the deflector panel at the ends of the deflector panel arms like the previously-discussed embodiments. The number, size, and location of the vent openings may vary and will likely depend in part on the deployment characteristics of the airbag module. It has been found in experiments with deflector panels having vent openings that 17 vents having a diameter of approximately 35 mm may be desirable in order to make a noticeable improvement in restraining an in-position occupant in certain airbag systems. Needless to say, any of the other embodiments of the invention may also include vent openings.

Figure 5:
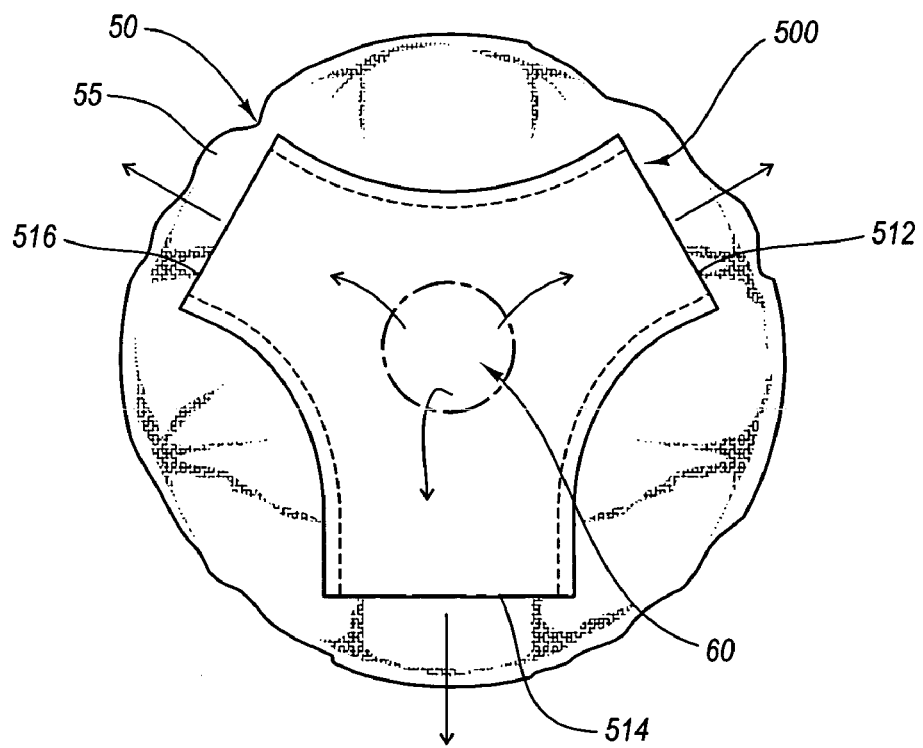
FIG. 5 is a plan view of still another embodiment of a deflector panel having three deflector panel arms.

FIG. 5 depicts still another embodiment of the invention. The deflector panel 500 shown in FIG. 5 includes three deflector panel arms, shown at 512, 514, and 516. Deflector panel 500 also includes one deflector panel arm—arm 514—that has a greater width than the other two deflector panel arms. Such a configuration may facilitate directing a greater portion of the inflation gas to certain areas of the airbag cushion body 50 as desired. This may be useful in order to more fully protect particular portions of an occupant's body during deployment. It may also be desirable in some embodiments to direct an arm having a greater width downward relative to an occupant. Doing so may be particularly useful when used in connection with airbag modules that are designed to remain stationary while an occupant rotates the steering wheel, thereby remaining in the same position relative to an occupant regardless of the rotational position of the steering wheel.

Of course, any—including more than one—of the arms may be widened as desired and, moreover widened arms may be employed in any of the other deflector panel embodiments. In addition, in should be understood that although FIG. 5 shows a deflector panel 500 formed from a single piece of material, three-arm embodiments of the invention may alternatively be formed from two or three separate pieces of material. Likewise, any of the other embodiments may be formed from any number of pieces of material as desired.

It will be obvious to those having skill in the art that many changes may be made to the details of the above-described embodiments without departing from the underlying principles of the invention. The scope of the present invention should, therefore, be determined only by the following claims.

The invention claimed is:

1. An airbag cushion for use in an airbag system including an inflator for inflating the airbag cushion, the airbag cushion comprising:
    an airbag cushion body having an inflator opening; and
    a deflector panel attached to the airbag cushion body with a plurality of attachment lines in a position such that the deflector panel at least partially deflects the inflation gas received from the inflator during inflation of the airbag cushion, wherein at least two attachment lines are substantially parallel to one another along at least a portion of the at least two attachment lines, wherein the deflector panel comprises a plurality of arms extending radially outward from the inflator opening, wherein the inflation gas is at least partially deflected through the arms, and wherein inflation gas is directed through inflation gas tunnels defined by the at least two attachment lines and also defined in part by the airbag cushion body and in part by the arms, such that the inflation gas tunnels allow the inflation gas to be deflected in a direction between the at least two attachment lines and to exit the inflation gas tunnel between substantially parallel sections of the at least two attachment lines in a direction substantially parallel to the at least two attachment lines.

2. The airbag cushion of claim 1, wherein the deflector panel comprises at least three arms.

3. The airbag cushion of claim 2, wherein at least one arm has a greater width along at least a portion of the at least one arm than at least one other arm.

4. The airbag cushion of claim 2, wherein the deflector panel comprises at least four arms.

5. The airbag cushion of claim 4, wherein two of the deflector panel arms extend in a first line and two other deflector panel arms extend in a second line, and wherein the first line intersects the second line.

6. The airbag cushion of claim 5, wherein the first line is approximately perpendicular to the second line such that the deflector panel forms a substantially plus-shaped configuration.

7. The airbag cushion of claim 5, wherein the deflector panel has a plurality of unattached portions, and wherein at least one of the plurality of unattached portions is located at every intersection between deflector panel arms.

8. The airbag cushion of claim 5, wherein the deflector panel has a plurality of weakly attached portions, and wherein at least one of the plurality of weakly attached portions is located at every intersection between deflector panel arms.

9. The airing cushion of claim 1, wherein the deflector panel has a plurality of vent openings formed therein.

10. The airbag cushion of claim 1, wherein the deflector panel has at least one unattached portion located approximately at the base of at least one of the arms.

11. The airbag cushion of claim 1, wherein the deflector panel has at least one weakly attached portion located approximately at the base of at least one of the arms.

12. The airbag cushion of claim 1, wherein the deflector panel comprises a single piece of material.

13. The airbag cushion of claim 1, wherein the deflector panel comprises two or more pieces of material.

14. The airbag cushion of claim 1, wherein the deflector panel arms are rectangular in shape.

15. The airbag cushion of claim 1, wherein the deflector panel is attached to the airbag cushion body with stitching.

16. The airbag cushion of claim 1, wherein the plurality of attachment lines define a plurality of inflation gas tunnels, and wherein each of the inflation gas tunnels extend radially outward from the inflator opening.

17. The airbag cushion of claim 1, wherein the attachment lines comprise sew lines.

18. The airbag cushion of claim 1, wherein the deflector panel comprises at least three inflation gas tunnels.

19. The airbag cushion of claim 18, wherein at least one inflation gas tunnel has a greater width along at least a portion of the at least one inflation gas tunnel than at least one other inflation gas tunnel.

20. The airbag cushion of claim 18, wherein the deflector panel comprises at least four inflation gas tunnels.

21. The airbag cushion of claim 20, wherein two of the inflation gas tunnels extend in a first line and two other inflation gas tunnels extend in a second line, and wherein the first line intersects the second line.

22. The airbag cushion of claim 21, wherein the deflector panel has a plurality of unattached portions, and wherein at least one of the plurality of unattached portions is located at every intersection between inflation gas tunnels.

23. The airbag cushion of claim 21, wherein the deflector panel has a plurality of weakly attached portions, and wherein at least one of the plurality of weakly attached portions is located at every intersection between deflector panel arms.

24. The airbag cushion of claim 21, wherein the first line is approximately perpendicular to the second line such that the inflation gas tunnels are arranged in a substantially plus-shaped configuration.

25. The airbag cushion of claim 1, wherein the deflector panel has a plurality of vent openings formed therein.

26. The airbag cushion of claim 1, wherein the deflector panel has at least one unattached portion located approximately at the based of at least one of the inflation gas tunnels.

27. The airbag cushion of claim 1, wherein the deflector panel has at least one weakly attached portion located approximately at the base of at least one of the inflation gas tunnels.

28. The airbag cushion of claim 1, wherein the deflector panel comprises two or more pieces of material.

29. The airbag cushion of claim 1, wherein the inflation gas tunnels are rectangular in shape.

30. An airbag cushion for use in an airbag system including an inflator for inflating the airbag cushion, the airbag cushion comprising:
    an airbag cushion body having an inflator opening; and
    a deflector panel attached to the airbag cushion body in a position such that the deflector panel at least partially deflects the inflation gas received from the inflator during inflation of the airbag cushion, wherein the deflector panel comprises a plurality of arms extending radially outward from the inflator opening, wherein the inflation gas is at least partially deflected through the arms, and wherein at least one of the deflector panel arms is not coincident with an inflation gas tunnel.

31. The airbag cushion of claim 30, wherein the deflector panel comprises at least three arms.

32. The airbag cushion of claim 31, wherein at least one arm has a greater width along at least a portion of the at least one arm than at least one other arm.

33. The airbag cushion of claim 31, wherein the deflector panel comprises at least four arms.

34. The airbag cushion of claim 33, wherein two of the deflector panel arms extend in a first line and two other deflector panel arms extend in a second line, and wherein the first line intersects the second line.

35. The airbag cushion of claim 34, wherein the first line is approximately perpendicular to the second line such that the deflector panel forms a substantially plus-shaped configuration.

36. The airbag cushion of claim 34, wherein the deflector panel has a plurality of unattached portions, and wherein at least one of the plurality of unattached portions is located at every intersection between deflector panel arms.

37. The airbag cushion of claim 34, wherein the deflector panel has a plurality of weakly attached portions, and wherein at least one of the plurality of weakly attached portions is located at every intersection between deflector panel arms.

38. The airbag cushion of claim 30, wherein the deflector panel has a plurality of vent openings formed therein.

39. The airbag cushion of claim 30, wherein the deflector panel has at least one unattached portion located approximately at the base of at least one of the arms.

40. The airbag cushion of claim 30, wherein the deflector panel has at least one weakly attached portion located approximately at the base of at least one of the arms.

41. The airbag cushion of claim 30, wherein the deflector panel comprises a single piece of material.

42. The airbag cushion of claim 30, wherein the deflector panel comprises two or more pieces of material.

43. The airbag cushion of claim 30, wherein the deflector panel arms are rectangular in shape.

44. The airbag cushion of claim 30, wherein the deflector panel is attached to the airbag cushion body with stitching.

45. The airbag cushion of claim 30, wherein inflation gas is directed through inflation gas tunnels defined in part by the airbag cushion body.

46. The airbag cushion of claim 30, wherein none of the deflector panel arms are coincident with an inflation gas tunnel.

* * * * *

UNITED STATES PATENT AND TRADEMARK OFFICE
CERTIFICATE OF CORRECTION

PATENT NO. : 7,210,702 B2  Page 1 of 1
APPLICATION NO. : 10/874452
DATED : May 1, 2007
INVENTOR(S) : Quin Soderquist It is certified that error appears in the above-identified patent and that said Letters Patent is hereby corrected as shown below:

Column 5, line 49, "claim 2" should be changed to --claim 1--

Column 6, line 1, "airing" should be changed to --airbag--

Column 6, line 29, "claim 18" should be changed to --claim 1--

Column 6, lines 48-49 claim 25, cancel the text "25. The airbag cushion of claim 1, wherein the deflector panel has a plurality of vent openings formed therein."

Column 6, lines 58-59 claim 28, cancel the text "28. The airbag cushion of claim 1, wherein the deflector panel comprises two or more pieces of material."

Column 7, line 13 claim 33, "claim 31" should be changed to --claim 30--

Signed and Sealed this

Second Day of December, 2008

JON W. DUDAS
*Director of the United States Patent and Trademark Office*